(12) United States Patent
Strathearn et al.

(10) Patent No.: US 12,223,103 B2
(45) Date of Patent: Feb. 11, 2025

(54) LIGHT SCANNER HAVING CLOSED-LOOP CONTROL BASED ON OPTICAL FEEDBACK

(71) Applicant: AdHawk Microsystems Inc., Waterloo (CA)

(72) Inventors: Duncan Wesley Strathearn, Waterloo (CA); Kenneth McCoubrey, Kitchener (CA); Nino Zahirovic, Waterloo (CA); Fan Yang, London (CA); Niladri Sarkar, Waterloo (CA)

(73) Assignee: AdHawk Microsystems Inc., Waterloo (CA)

( * ) Notice: Subject to any disclaimer, the term of this patent is extended or adjusted under 35 U.S.C. 154(b) by 110 days.

(21) Appl. No.: 18/099,604

(22) Filed: Jan. 20, 2023

(65) Prior Publication Data

US 2023/0152888 A1 May 18, 2023

Related U.S. Application Data

(63) Continuation-in-part of application No. 17/874,385, filed on Jul. 27, 2022, now Pat. No. 11,914,768, (Continued)

(51) Int. Cl.
*G06F 3/01* (2006.01)
*G02B 26/08* (2006.01)
(Continued)

(52) U.S. Cl.
CPC ......... *G06F 3/013* (2013.01); *G02B 26/0833* (2013.01); *G02B 26/105* (2013.01);
(Continued)

(58) Field of Classification Search
CPC ... G06F 3/013; G02B 26/0833; G02B 26/105; G02B 27/0093; G02B 27/0172; G02B 27/0176; G02B 2027/0178; G02B 26/101
See application file for complete search history.

(56) References Cited

U.S. PATENT DOCUMENTS 5,638,176 A 6/1997 Hobbs et al.
7,388,699 B1 6/2008 Coffee
(Continued)

OTHER PUBLICATIONS

Non-Final Rejection Mailed on Aug. 9, 2023 for U.S. Appl. No. 17/874,385, 17 page(s).
(Continued)

*Primary Examiner* — Stephen G Sherman
(74) *Attorney, Agent, or Firm* — Kaplan Breyer Schwarz, LLP

(57) ABSTRACT

Systems and methods for monitoring the instantaneous position of a scanning element of a light scanner via an optical-feedback signal are disclosed, where the optical-feedback signal is a portion of a light signal being steered in a two-dimensional pattern by the light scanner. The optical-feedback signal is detected by a position monitor that provides a commensurate feedback signal. In some embodiments, the feedback signal is used to develop a transfer function for the light scanner via a calibration routine. In some embodiments, the feedback signal is used in a closed-loop driving scheme used to drive the light scanner. Embodiments in accordance with the present disclosure are particularly well suited for use in object tracking systems, such as eye trackers.

24 Claims, 9 Drawing Sheets

Related U.S. Application Data which is a continuation-in-part of application No. 17/143,048, filed on Jan. 6, 2021, now Pat. No. 11,435,823, which is a continuation-in-part of application No. 17/087,302, filed on Nov. 2, 2020, now Pat. No. 11,379,035, which is a continuation of application No. 15/876,148, filed on Jan. 20, 2018, now Pat. No. 10,824,229.

(60) Provisional application No. 62/448,577, filed on Jan. 20, 2017, provisional application No. 63/227,160, filed on Jul. 29, 2021.

(51) Int. Cl.
*G02B 26/10* (2006.01)
*G02B 27/00* (2006.01)
*G02B 27/01* (2006.01)

(52) U.S. Cl.
CPC ..... *G02B 27/0093* (2013.01); *G02B 27/0172* (2013.01); *G02B 27/0176* (2013.01); *G02B 2027/0178* (2013.01)

(56) References Cited

U.S. PATENT DOCUMENTS

| | | |
|---|---|---|
| 10,824,229 B2 | 11/2020 | Sarkar |
| 11,379,035 B2 | 7/2022 | Sarkar |
| 11,435,823 B2 | 9/2022 | Sarkar et al. |
| 2002/0014579 A1 | 2/2002 | Dunfield |
| 2004/0061831 A1 | 4/2004 | Aughey et al. |
| 2004/0120023 A1 | 6/2004 | Bush et al. |
| 2007/0001248 A1 | 1/2007 | Geisberger et al. |
| 2007/0081241 A1 | 4/2007 | Hayashi |
| 2008/0266818 A1 | 10/2008 | Collet et al. |
| 2008/0285103 A1 | 11/2008 | Mizumoto |
| 2009/0062658 A1 | 3/2009 | Dunki-Jacobs et al. |
| 2009/0243997 A1 | 10/2009 | Tierling et al. |
| 2013/0242364 A1 | 9/2013 | Kilcher et al. |
| 2015/0047078 A1 | 2/2015 | Sarkar et al. |
| 2015/0235355 A1 | 8/2015 | Mullins |
| 2016/0029883 A1 | 2/2016 | Cox |
| 2016/0166146 A1 | 6/2016 | Sarkar |
| 2016/0240013 A1 | 8/2016 | Spitzer |
| 2017/0038253 A1 | 2/2017 | Mallinson |
| 2017/0067609 A1 | 3/2017 | Ichikawa et al. |
| 2017/0115483 A1 | 4/2017 | Aleem et al. |
| 2017/0123489 A1 | 5/2017 | Guenter |
| 2017/0364732 A1 | 12/2017 | Komogortsev |
| 2018/0189977 A1 | 7/2018 | Zecchini et al. |
| 2018/0210547 A1 | 7/2018 | Sarkar |
| 2019/0120940 A1 | 4/2019 | Pei et al. |
| 2019/0204913 A1 | 7/2019 | Sarkar et al. |
| 2022/0261074 A1 | 8/2022 | Zahirovic et al. |
| 2022/0382370 A1 | 12/2022 | Strathearn et al. |

OTHER PUBLICATIONS

Notice of Allowance and Fees Due (PTOL-85) Mailed on Dec. 5, 2023 for U.S. Appl. No. 17/874,385, 5 page(s).

Non-Final Rejection Mailed on May 8, 2023 for U.S. Appl. No. 18/098,899, 13 page(s).

Notice of Allowance and Fees Due (PTOL-85) Mailed on Jul. 10, 2023 for U.S. Appl. No. 18/098,899, 6 page(s).

Final Rejection Mailed on Jun. 15, 2020 for U.S. Appl. No. 15/876,148.

Final Rejection received for U.S. Appl. No. 15/876,148, mailed on Aug. 23, 2019, 11 pages.

Jacob Engelberg et al., "The Advantages of metalenses over diffractive lenses," "Nature Communications", vol. 11, dated 2020 (https://doi.org/10.1038/s41467-020-15972-9), 4 pp.

Non-Final Office Action received for U.S. Appl. No. 15/876,148, mailed on Feb. 24, 2020, 15 pages.

Non-Final Rejection Mailed on Apr. 29, 2021 for U.S. Appl. No. 16/232,410.

Non-Final Rejection Mailed on Jan. 7, 2022 for U.S. Appl. No. 17/143,048.

Non-Final Rejection Mailed on Jun Jun. 18, 2020 for U.S. Appl. No. 16/236,993.

Non-Final Rejection Mailed on Oct. 27, 2020 for U.S. Appl. No. 16/234,293.

Non-Final Rejection Mailed on Sep. 3, 2021 for U.S. Appl. No. 17/087,302.

Non-Final Rejection received for U.S. Appl. No. 15/876,148, mailed on May 3, 2019, 9 pages.

Notice of Allowance and Fees Due (PTOL-85) Mailed on Jul. 16, 2020 for U.S. Appl. No. 15/876,148.

Notice of Allowance and Fees Due (PTOL-85) Mailed on Mar. 23, 2022 for U.S. Appl. No. 17/087,302.

Notice of Allowance and Fees Due (PTOL-85) Mailed on Mar. 5, 2021 for U.S. Appl. No. 16/234,293.

Notice of Allowance and Fees Due (PTOL-85) Mailed on May 18, 2022 for U.S. Appl. No. 17/143,048.

Notice of Allowance and Fees Due (PTOL-85) Mailed on Oct. 7, 2020 for U.S. Appl. No. 16/236,993.

Notice of Allowance Mailed on Oct. 20, 2021 for U.S. Appl. No. 16/232,410.

Zhaoyi Li et al., "Meta-Optics achieves RGB-achromalic focusing for virtual reality," Science Advances, vol. 7, No. 5, Jan. 27, 2021 (www.doi.org/10.1126/sciadv.abe4458), 8 pp.

Notice of Allowance and Fees Due (PTOL-85) Mailed on Oct. 19, 2022 for U.S. Appl. No. 17/673,337.

Notice of Allowance received for U.S. Appl. No. 17/673,337, mailed on Oct. 27, 2022, 2 pages.

LIGHT SCANNER HAVING CLOSED-LOOP CONTROL BASED ON OPTICAL FEEDBACK

CROSS REFERENCE TO RELATED APPLICATIONS

This case is a continuation-in-part of co-pending U.S. patent application Ser. No. 17/874,385, filed Jul. 27, 2022, which is a continuation-in-part of U.S. patent application Ser. No. 17/143,048 (now U.S. Pat. No. 11,435,823), filed Jan. 6, 2021, which is a continuation-in-part of U.S. Non-Provisional patent application Ser. No. 17/087,302 (now U.S. Pat. No. 11,379,035), filed Nov. 2, 2020, which is a continuation of U.S. Non-Provisional patent application Ser. No. 15/876,148 (now U.S. Pat. No. 10,824,229), filed Jan. 20, 2018, which claims the benefit of U.S. Provisional Patent Application Ser. No. 62/448,577 filed Jan. 20, 2017, and U.S. Provisional Patent Application Ser. No. 63/227,160 filed Jul. 29, 2021, each of which is incorporated by reference as if set forth at length herein.

The present Specification also includes concepts disclosed in U.S. Pat. No. 10,213,105, issued Feb. 26, 2019, U.S. Pat. No. 10,317,672, issued Jun. 11, 2019, and U.S. Pat. No. 10,908,683, issued Feb. 2, 2021, each of which is incorporated by reference as if set forth at length herein. If there are any contradictions or inconsistencies in language between this application and the cases that have been incorporated by reference that might affect the interpretation of the claims in this case, the claims in the instant case should be interpreted to be consistent with the language in the instant Specification.

TECHNICAL FIELD

The present disclosure relates to object-tracking systems and, more particularly, to eye-tracking systems.

BACKGROUND

MEMS-based scanning elements are very small form-factor devices used to steer optical beams in one or more dimensions. They are attractive for use in many applications, such as LiDAR, object tracking, free-space optical switching, eye tracking and more.

Typically, a scanning element is driven "open loop," where the positional response of the element to a given drive voltage is assumed based on an initial calibration routine in which the position of the element is measured for a set of drive voltages, thereby indicating a transfer function for the device.

Unfortunately, while open-loop driving of a scanning element is the simplest approach, a device's transfer function is affected by many factors, including fabrication variations, variations within manufacturing positional and angular tolerances, and system drift. Such factors can lead to deviations from its anticipated response and uncertainty in the actual response of a mirror to a given drive signal.

Furthermore, these issues are exacerbated when a mirror is electrothermally actuated. Such actuators can subject a mirror to large temperature excursions and mechanical stresses that are known to accelerate material-degradation processes such as creep, electromigration, chemical reactions, and desorption, which can contribute to long-term instabilities in the material properties of the mirror and its actuators, thereby inducing changes in its transfer function. Still further, package stresses can couple into mirror devices, and variations in package stresses can be caused by gradual changes in substrate temperatures.

In many applications, such as eye tracking, device or system drift inevitably leads to a decrease in accuracy over time. As a result, frequent recalibration is necessary to enable proper operation of conventional MEMS-based scanning elements.

A scanning element that can be driven in closed-loop fashion would mitigate some, if not all, of the above issues; however, it has proven difficult to reliably sense the instantaneous position of a MEMS-based scanning element in order to provide a feedback signal to enable a closed-loop drive scheme.

SUMMARY

The present disclosure is directed toward two-axis, resonant, MEMS-based light scanners having an integrated feedback signal that indicates the instantaneous position of its scanning element. Embodiments in accordance with the present disclosure are particularly well suited for use in object tracking systems that employ a Lissajous light-scan pattern for rapidly interrogating a scan region with high scan density.

An advance over the prior art is realized by monitoring the instantaneous position of a two-axis scanning element using an optical-feedback signal arising from the mirror itself and within the package in which the scanning element is contained. This positional information can be used for calibration of the scanning element and/or in a closed-loop element-control drive scheme used to control the scanning element during operation.

An illustrative embodiment in accordance with the present disclosure is an eye tracking system that includes a source module and detector module mounted on a conventional eyeglass frame such that the source module is configured to steer a light signal through a two-dimensional pattern in a scan region on an eye, while the detector module is configured to detect one or more reflections of the light signal from the scan region. The detector module provides a commensurate output signal to a processor for determination of the gaze vector of the eye.

The source module includes a package having a housing and a transparent lid, where the housing encloses a scanner chip comprising a MEMS-based resonant scanning mirror that is monolithically integrated with a plurality of photodiodes that function as monitor detectors. The scanner chip and housing are arranged such that, as the light signal is directed through the lid and steered through its two-dimensional pattern, Fresnel reflections of the light signal off the lid are received by the monitor detectors. The output signals of the monitor detectors are monitored as a function of time and are used to determine the instantaneous position of the mirror.

In some embodiments, the drive signals and corresponding scanning-element positions are used in a calibration routine for determining the transfer function of the scanner.

In some embodiments, changes in the transfer function of the scanner are detected as changes in the output signals of the photodiodes, enabling the drive signals provided to the scanner to be adjusted accordingly.

In some embodiments, the lid includes an optical element configured to redirect a portion of the scan signal toward the photodiodes.

An embodiment in accordance with the present disclosure is a system comprising: a source module comprising: a light scanner having a scanning element that is configured to receive a first light signal and steer (1) an interrogation signal in a first two-dimensional pattern over a scan region and (2) an optical-feedback signal in a second two-dimensional pattern over a first region, the interrogation signal including a first portion of the first light signal and the optical-feedback signal including a second portion of the first light signal, wherein the light scanner comprises a micromechanical system (MEMS) device that is a two-axis device having a first axis characterized by a first resonant frequency and a second axis characterized by a second resonant frequency; and a first package that contains the light scanner, the first package including a lid that is substantially transparent for the first light signal; a position monitor located in the first region, the position monitor configured to provide a feedback signal based on the optical-feedback signal; and a processor configured to estimate an instantaneous position of the scanning element based on the feedback signal.

Another embodiment in accordance with the present disclosure is a method comprising: receiving a first light signal at a light scanner that is a micromechanical system (MEMS) device having a scanning element, a first actuator, and a second actuator, the first actuator being configured to rotate the scanning element about the first axis and the second actuator configured to rotate the scanning element about a second axis, wherein the first axis has a first resonant frequency and the second axis has a second resonant frequency; driving the light scanner to steer (1) an interrogation signal in a first two-dimensional pattern over a scan region and (2) an optical-feedback signal in a second two-dimensional pattern over a first region, the interrogation signal including a first portion of the first light signal and the optical-feedback signal including a second portion of the first light signal; providing a feedback signal based on the optical-feedback signal, the feedback signal being provided by a position monitor located within the first region; and estimating an instantaneous position of the scanning element based on the feedback signal.

DETAILED DESCRIPTION

Figure 1:
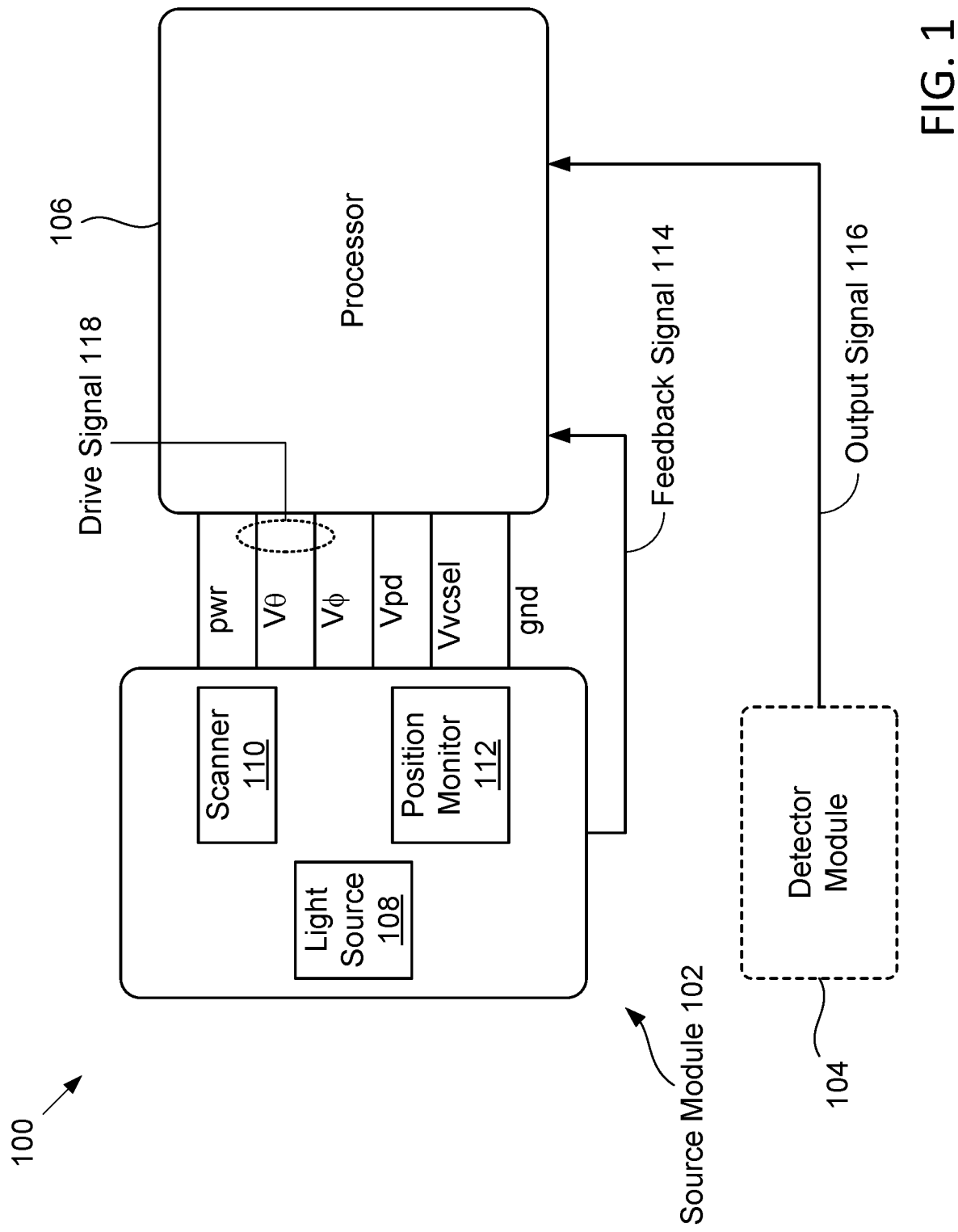
FIG. 1 depicts a high-level schematic block diagram illustrating an exemplary eye tracking system according to aspects of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The functions of the various elements shown in the Drawing, including any functional blocks that may be labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the figures comprising the drawing are not drawn to scale.

FIG. 1 depicts a high-level schematic block diagram illustrating an exemplary eye tracking system according to aspects of the present disclosure. As will be apparent to those skilled in the art by inspection of this figure, such illustrative systems constructed according to aspects of the present disclosure exhibit substantial improvements in size, cost, power consumption, bandwidth and precision as compared with prior art eye-tracking systems.

In the depicted example, eye-tracking system 100 includes source module 102, detector module 104, and processor 106, among other elements (e.g., memory, power module, etc.).

Source module 102 includes light source 108, scanner 110, and position monitor 112.

Light source 108 is a conventional light source configured for providing a suitable light signal to scanner 110. In the depicted example, light source 108 provides a light signal having approximately 1 mW of optical power at 940 nm. The light signal has a Full-Width-at-Half-Maximum (FWHM) divergence of approximately 20 degrees, which is collimated and redirected toward scanner 110 by a reflective Off-Axis-Parabola (OAP) that is integrated in the package, as discussed below. After it reflects off the OAP, the light signal has a divergence of approximately 1-2 degrees. It should be noted, however, that light source 108 can be any of any variety known in the art without departing from the scope of the present disclosure.

Scanner 110 is a two-axis resonant MEMS-based scanning element that is configured to receive the light signal and scan it in a two-dimensional scan pattern over a region of an eye being tracked. As discussed in more detail below, in the depicted example, the scanning element of scanner 110 is a mirror; however, myriad scanning element can be used in a scanner without departing from the scope of the present disclosure. As discussed in more detail below, scanner 110 includes first and second rotation axes, each of which is characterized by a resonant frequency, and each of which is driven with a periodic signal whose drive frequency is close to the resonant frequency of its respective axis. Emphasizing simple design principles according to the present disclosure, scanner 110 is preferably a two-axis, resonant micro-electromechanical system (MEMS) device having two orthogonal rotation axes.

Position monitor 112 is an optical detector configuration for providing feedback signal 114, which provides processor 106 with an indication of the instantaneous position of the mirror of scanner 110. Position monitor is described in more detail below and with respect to FIGS. 3 and 4.

Detector module 104 includes one or more non-imaging photodetectors configured to receive a portion of the light signal that is reflected from the eye region and provide output signal 116 to processor 106. In the depicted example, detector module 104 includes a single non-imaging, discrete photodetector. For the purposes of this disclosure, including the appended claims, a "discrete detector" is defined as an optoelectronic device having no more than four electrically independent detection regions on a single substrate, where each detection region is operative for providing one electrical signal whose magnitude is based on the intensity of light incident upon that detection region. Examples of discrete detectors include detectors having only one detection region, split detectors having two detection regions, four-quadrant detectors having four detection regions, and position-sensitive detectors. The definition of discrete detector explicitly excludes individual pixels, or groups of pixels, within array devices for collectively providing spatially correlated image information (i.e., imaging detectors), such as focal-plane arrays, image sensors, and the like.

In some embodiments, detector module 104 includes multiple non-imaging photodetectors that provide multiple output signals to the processor. Photodetector 104 can be any of any variety known in the art without departing from the scope of the present disclosure. Although the depicted example includes a photodiode module having a single photodiode, in some embodiments, multiple photodiodes are used to provide a richer data set for position of the eye.

As illustrated, processor 106 is communicatively coupled to source module 102 via a number of signal lines namely, pwr, drive signal 118 (which includes V$\theta$ and V$\phi$), Vpd, Vvcsel, gnd, and feedback signal 114, which correspond to electrical power, a drive signal for the scanner, driving voltages for detector module 104 and light source 108, ground signals, and a position-feedback signal for the mirror of scanner 110, respectively. Note that for simplicity, individual elements comprising the module(s) are not specifically shown in this illustrative figure namely, the MEMS scanning device, photodetector, VCSEL etc. As we shall show and describe, source module and detector module are located and operated at a physical distance apart from one another.

Processor 106 is a controller/processor configured to drive the components of source module 102 with appropriate drive signals, receive feedback signal 114 from source module 102, receive output signal 116 from detector module 104, and generate an estimate of the gaze vector of an eye being monitored with system 100 based on output signal 116, among other functions.

In some embodiments, processor 106 includes one or more components containing processing and control circuitry that can include hardware structured to execute functions in accordance with the present disclosure. In some embodiments, such circuitry can include machine-readable media for configuring the hardware to execute the functions described herein. Furthermore, the processing circuitry of processor 106 can be embodied as one or more circuitry components including, but not limited to, processing circuitry, network interfaces, peripheral devices, input devices, output devices, sensors, etc. In some embodiments, such processing circuitry can take the form of one or more analog circuits, electronic circuits (e.g., integrated circuits (IC), application-specific integrated-circuits (ASICs), discrete circuits, system on a chip (SOCs) circuits, etc.), telecommunication circuits, hybrid circuits, and any other type of "circuit," or combinations thereof. In this regard, "processing circuitry" can include one or more of any type of component for accomplishing or facilitating achievement of operations in accordance with the present disclosure. For example, a circuit as described herein can include one or more transistors, logic gates (e.g., NAND, AND, NOR, OR, XOR, NOT, XNOR, etc.), resistors, multiplexers, registers, capacitors, inductors, diodes, wiring, and so on).

"Processing circuitry" can also include one or more processors and/or controllers communicably coupled to one or more memory or memory devices. In this regard, the one or more processors can execute instructions stored in the memory or can execute instructions otherwise accessible to the one or more processors. In some embodiments, the one or more processors can be embodied in various ways. The one or more processors can be constructed in a manner sufficient to perform at least the operations described herein. In some embodiments, the one or more processors can be shared by multiple circuits (e.g., circuit A and circuit B can comprise or otherwise share the same processor which, in some example embodiments, can execute instructions stored, or otherwise accessed, via different areas of memory). Alternatively, or additionally, the one or more processors can be structured to perform or otherwise execute certain operations independent of one or more co-processors. In other example embodiments, two or more processors can be coupled via a bus to enable independent, parallel, pipelined, or multi-threaded instruction execution. Each processor can be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors can take the form of a single core processor, multi-core processor (e.g., a dual core processor, triple core processor, quad core processor, etc.), microprocessor, etc. In some embodiments, the one or more processors can be external to the apparatus, for example the one or more processors can be a remote processor (e.g., a cloud-based processor). Alternatively, or additionally, the one or more processors can be internal and/or local to the apparatus. In this regard, a given circuit or components thereof can be disposed locally (e.g., as part of a local server, a local computing system, etc.) or remotely (e.g., as part of a remote server such as a cloud-based server). To that end, processing circuitry in accordance with the present disclosure can include components that are distributed across one or more locations.

The present disclosure contemplates methods, systems and program products on any machine-readable media for accomplishing various operations. The embodiments of the present disclosure can be implemented using existing computer processors, or by a special purpose computer processor and/or controller for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general-purpose computer, special purpose computer, or special purpose processing machines to perform a certain function or group of functions.

Figure 2:
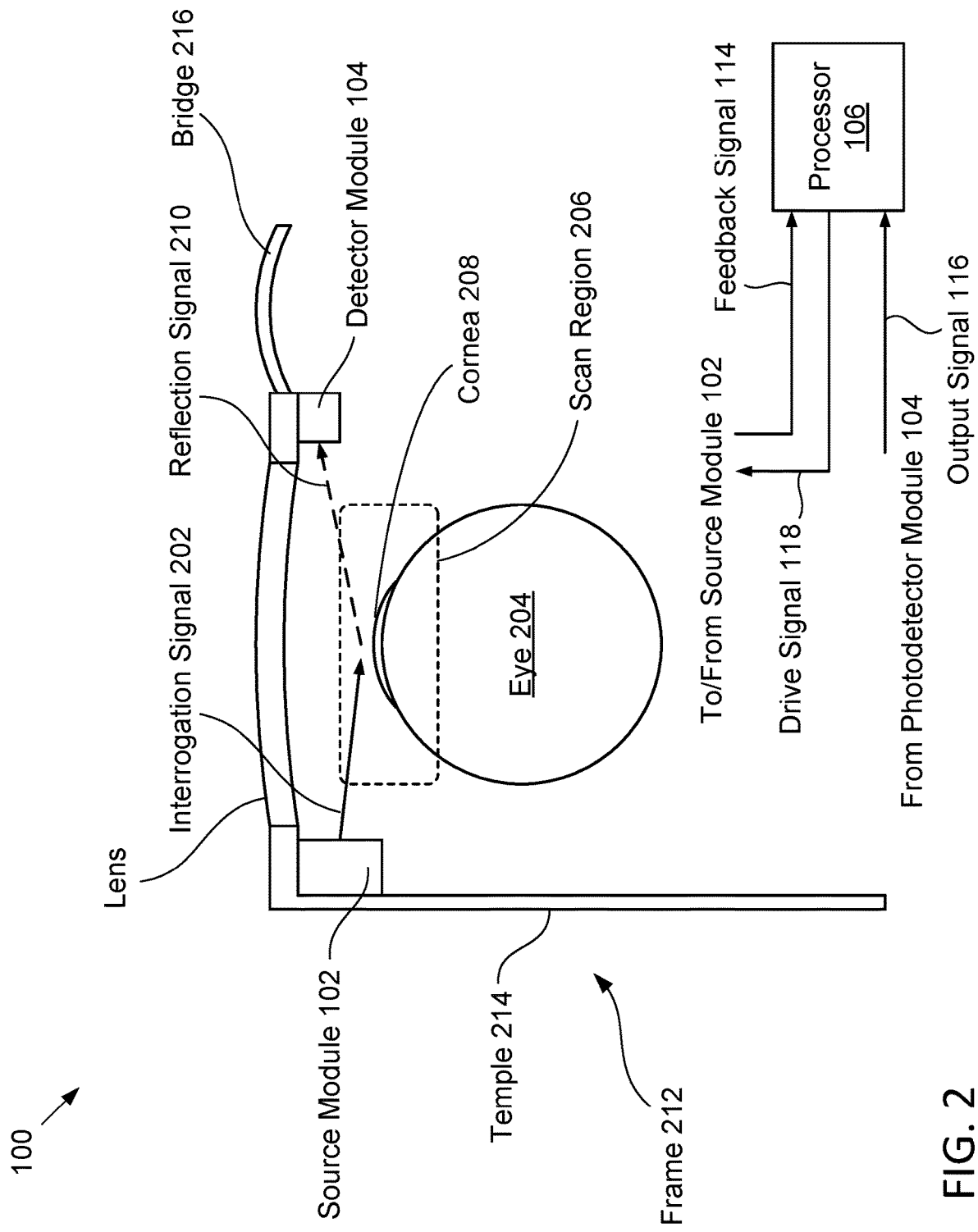
FIG. 2 depicts a schematic drawing of an exemplary operational geometry for an eye-tracker system in accordance with the present disclosure.

FIG. 2 depicts a schematic drawing of an exemplary operational geometry for an eye-tracker system in accordance with the present disclosure. Some eye-tracker system geometries according to aspects of the present disclosure include a MEMS scanner that sweeps a beam of light (i.e., an interrogation signal) in a two-dimensional scan pattern over a region of an eye (typically the region containing the cornea) and a photodetector that receives light reflected from the region.

In the depicted example, source module 102 is mounted to temple 214 of eyeglass frame 212, while detector module 104 is mounted to the frame 212 near bridge 216.

Light source 108 emits light signal 218, which comprises optical energy that is substantially collimated within source module 102. At least a portion of light signal 218 is then steered by scanner 110 over scan region 206 as interrogation signal 202. In the depicted example, scan region 206 includes cornea 208; however, in some embodiments, a scan region includes a different surface feature of the eye.

The scan pattern generated by source module 102 is based on drive signal 118, which includes electrical signals V$\theta$ and V$\phi$. These electrical signals are provided by processor 106 to the rotation axes of scanner 110. As discussed below in more detail, each axis of scanner 110 is characterized by a resonant frequency and driven with a periodic signal having a drive frequency that is based on that resonant frequency. Those skilled in the art will appreciate that periodic drive signals provided to each axis of scanner 110 gives rise to a scan pattern that is substantially a Lissajous curve (also known as a Lissajous figure), which is the graph of a system of parametric equations defined by $x=A \sin(at+\delta)$; $y=B \sin(bt)$.

Optical energy of interrogation signal 202 is reflected from the surface of cornea 208 at a glancing angle (~60 degrees to the normal) onto photodiode module 104 as reflected signal 210. As eye 204 rotates, the intensity of reflected signal 210 changes as a function of the position of a unique point on cornea 208, thereby enabling a system according to aspects of the present disclosure to track position of this point and, as a consequence, the position of the cornea. Notably, the surface area of the photodiode acts as a spatial filter to remove any high frequencies from the far-field pattern projected by the scanner.

Detector module 104 detects reflected signal 210 and provides corresponding output signal 116 to processor 106, which generates an estimate of the gaze vector of the eye based on the output signal.

Typically, prior-art scanning mirrors are driven "open loop" when interrogating a scan region, wherein the positional response of the mirror to a given drive voltage is assumed based on a transfer function for the device determined during an initial calibration routine. However, as discussed above, over time this transfer function can change due to changes in the material parameters of the scanning mirror and/or its actuators, packaging issues, environmental influences, and the like. As a result, prior-art scanners require frequent recalibration to ensure their proper function.

It is an aspect of the present disclosure that a portion of the optical energy giving rise to interrogation signal 202 can be used in real time as an optical-feedback signal to track the instantaneous position of the scanning mirror. This enables more rapid and simpler calibration of the scanning mirror and/or appropriate compensation of drive signal 118. In other words, the inclusion of a position monitor enables a closed-loop drive scheme that substantially ensures proper system performance.

Preferably, an optical-feedback signal used to track the position of the mirror of scanner 110 arises from within source module 102 itself; however, an optical-feedback signal can be generated anywhere within system 100 without departing from the scope of the present disclosure.

Figure 3:
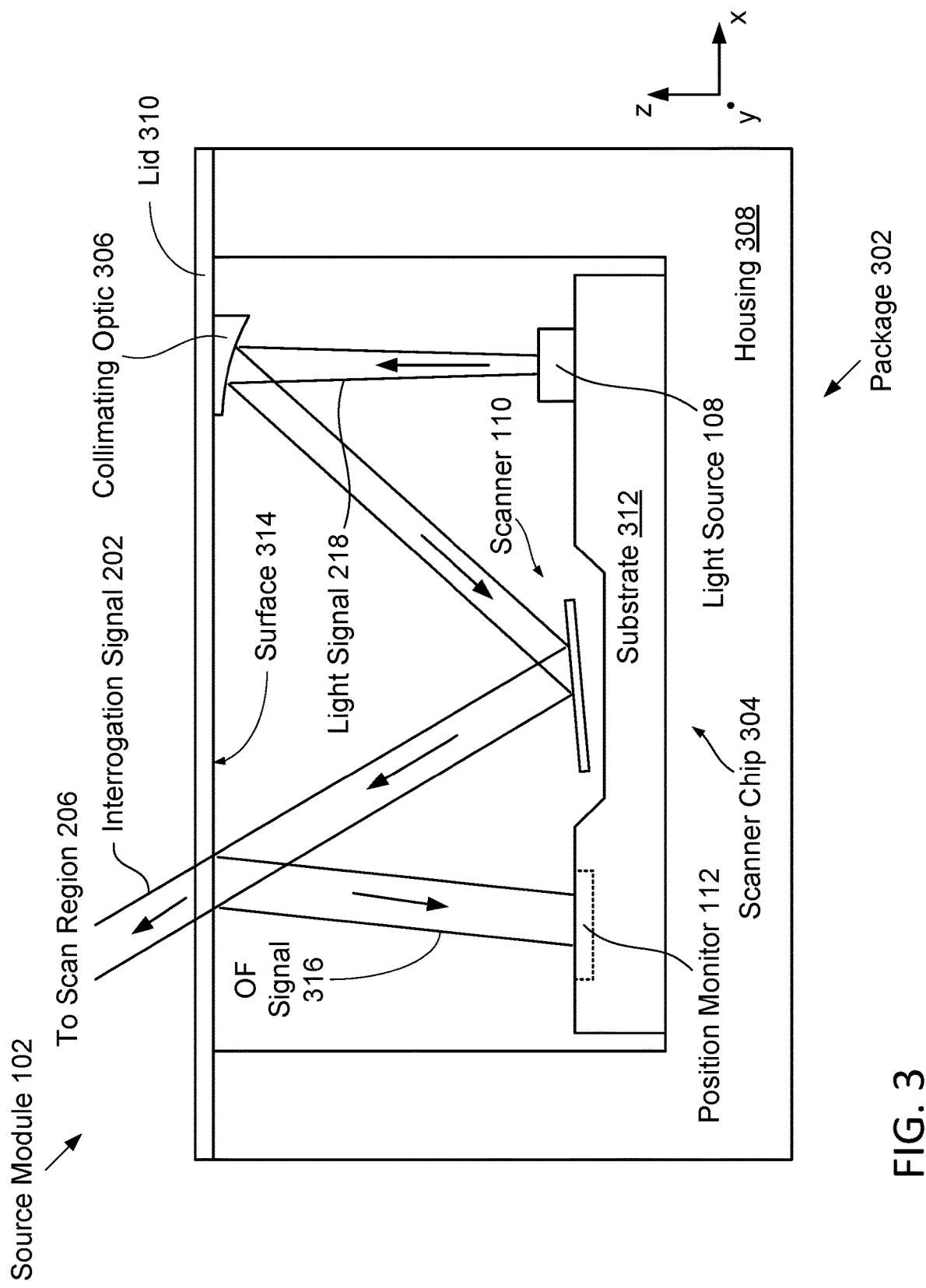
FIG. 3 depicts a schematic drawing of a cross-sectional view of a first example of a source module in accordance with the present disclosure.

FIG. 3 depicts a schematic drawing of a cross-sectional view of a first example of a source module in accordance with the present disclosure. Source module 102 comprises package 302, which encloses scanner chip 304 and collimating optic 306.

Package 302 is a substantially environmentally sealed package that includes housing 308 and lid 310.

Housing 308 is a conventional electronics package suitable for containing scanner chip 304 and enabling electrical connectivity the scanner chip and light source 108.

Lid 310 is a substantially transparent plate that is sealed in conventional fashion to housing 308 to provide an environmentally protected environment for scanner chip 304, light source 108, and collimating optic 306, each of which is enclosed therein. In the depicted example, lid 310 is a glass substrate that is epoxied to housing 308 to complete package 302 and fully enclose scanner chip 304 and light source 108.

Figure 4:
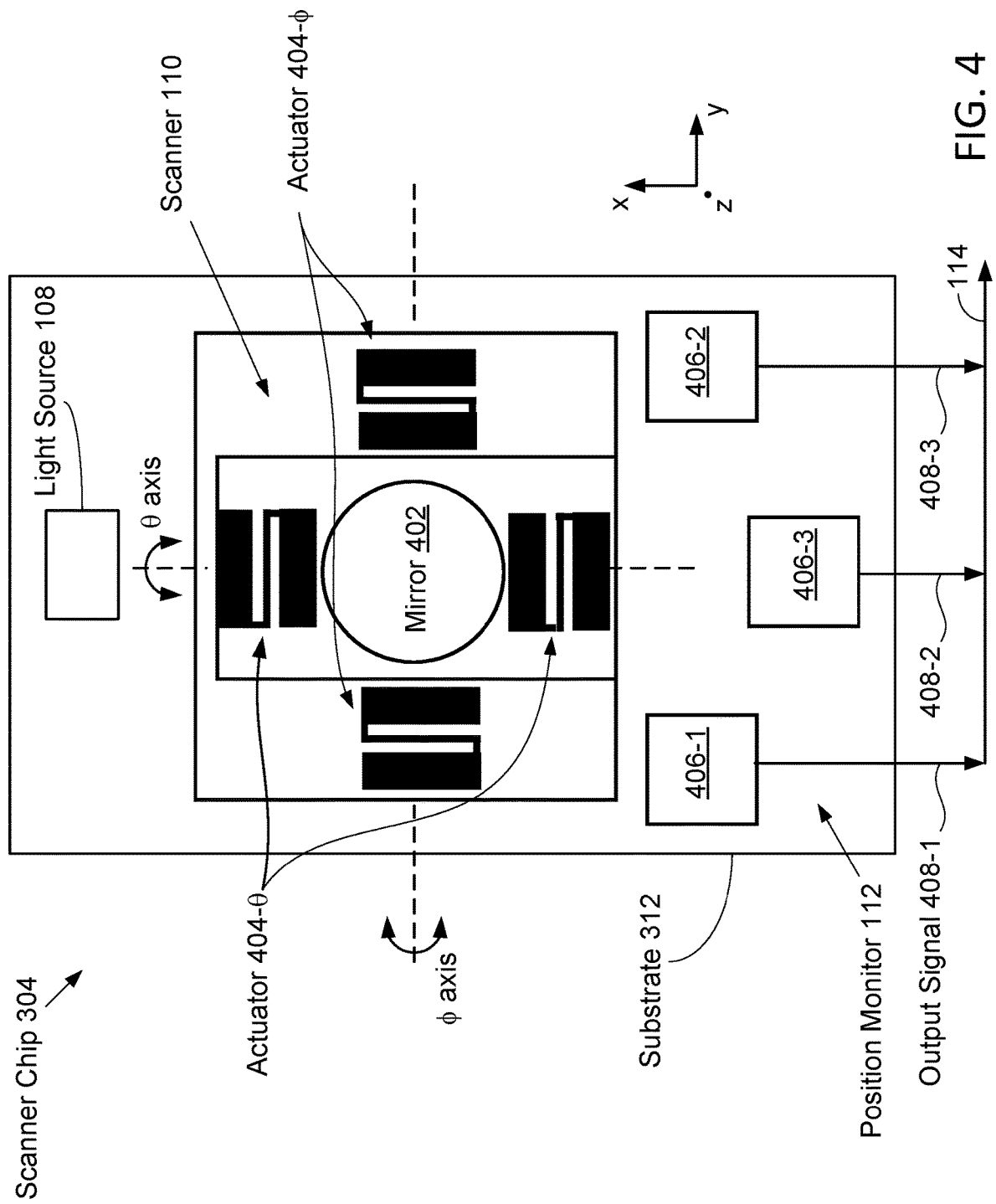
FIG. 4 depicts a more detailed schematic drawing of a plan view of a scanner chip in accordance with the present disclosure.

FIG. 4 depicts a more detailed schematic drawing of a plan view of a scanner chip in accordance with the present disclosure. Scanner chip 304 includes light source 108, scanner 110, and position monitor 112.

Scanner 110 is an isothermally actuated, two-axis, gimbal-mounted scanning mirror that is configured to controllably rotate about two orthogonal axes. Scanner 110 includes mirror 402 and actuators 404-$\theta$ and 404-$\phi$.

Position monitor 112 is an optical detector configuration that provides electrical feedback signal 114 to processor 106 based on the instantaneous position of the mirror of scanner 110.

In the depicted example, scanner 110 and position monitor 112 are formed on substrate 312 such that they are monolithically integrated. Preferably, scanner 110 and position monitor 112 are fabricated via conventional CMOS fabrication techniques, as described in U.S. Patent Publication 20150047078, entitled "Scanning Probe Microscope Comprising an Isothermal Actuator," published Feb. 12, 2015, and U.S. Patent Publication 20070001248, entitled "MEMS Device Having Compact Actuator," published Jan. 4, 2007, each of which is incorporated herein by reference. It should be noted that, the use of CMOS fabrication to form the scanner and position monitor facilitates their monolithic integration.

Furthermore, in the depicted example, scanner chip 304 also includes light source 108, which is joined to substrate 312 using conventional hybrid integration techniques. In some embodiments, at least one of light source 108 and position monitor 112 is located on a different substrate than scanner 110. In some embodiments, light source 108, scanner 110, and position monitor 112 are separate chips that are mounted on a common substrate to form a multi-chip module.

Mirror 402 is a substantially flat first-reflector surface formed on a structurally rigid plate. Although the depicted scanner comprises a scanning element that is a plane mirror, in some embodiments, scanner 110 includes a different scanning element, such as a Fresnel zone plate, etc. As will be apparent to one skilled in the art, after reading this Specification, scanner 110 can include any suitable scanning element for steering a light signal without departing from the scope of the present disclosure. Examples of alternative optical elements suitable for use in accordance with the present disclosure include, without limitation, other diffractive elements (e.g., holograms, Dammann gratings, etc.), refractive elements, lenses, and the like.

Mirror 402 is operatively coupled with actuators 404-$\theta$ and 404-$\phi$ (referred to, collectively, as actuators 404), which are arranged orthogonally about the mirror to enable its rotation about orthogonal $\theta$ and $\phi$ axes, each of which is characterized by a characteristic resonant frequency.

Each of actuators 404-$\theta$ and 404-$\phi$ comprises a pair of actuator elements that are located on opposite sides of mirror 402, where the actuator elements are opposed serpentine, silicon-based, thermal actuators that collectively define their respective rotation axes.

Actuator 404-$\theta$ is configured to impart rotation about the $\theta$ axis in response to voltage V$\theta$ of drive signal 118 from processor 106, while actuator 404-$\phi$ is configured to impart rotation about the $\phi$ axis in response to voltage V$\phi$ of drive signal 118 from processor 106.

In the depicted example, mirror 402 is electrically grounded and resonant two-dimensional scanning of the mirror is realized by applying appropriate sinusoidal drive signals to actuators 404-$\theta$ and 404-$\phi$. In response to drive signal 118, scanner 110 steers the interrogation signal through a desired two-dimensional pattern on scan region 206. In the depicted example, the desired pattern is a precessing Lissajous curve in response to each of V$\theta$ and V$\phi$ being a periodic signal whose frequency is close to the resonant frequency of its respective axis. As discussed in the parent application, U.S. patent application Ser. No. 17/874,385, the use of a precessing Lissajous curve to interrogate scan region 206 affords embodiments in accordance with the present disclosure significant advantages over the prior art.

It should be noted that mirror 402 and actuators 404-$\theta$ and 404-$\phi$ are merely exemplary and a wide range of scanning elements and/or MEMS actuators can be used in scanner 110 without departing from the scope of the present disclosure. Examples of alternative scanning elements and rotary actuators suitable for use in accordance with the present disclosure are described in detail in, for example, U.S. Pat. Pub. Nos. 20180210547, 20150047078, 20160166146, and 20190204913, each of which is incorporated herein by reference.

For example, in some embodiments, at least one actuator of a scanner is not an isothermal actuator. In some embodiments, at least one of actuators 404-$\theta$ and 404-$\phi$ comprises an actuator other than a thermal actuator, such as an electrostatic comb-drive actuator, parallel lid electrostatic actuator, piezoelectric actuator, electromagnetic actuator, and the like.

Returning now to FIG. 3, collimating optic 306 is a reflective optical element disposed on inside surface 314 of lid 310. Collimating optic 306 collimates light signal 218 and redirects it toward scanner 110 without significant loss. After it reflects off collimating optic 306, light signal 218 has a divergence of approximately 1-2 degrees. In some embodiments, collimating optic 306 only partially reduces the divergence of light signal 218 (i.e., it "partially collimates" the light signal) and scanner 110 further collimates the light signal. In some embodiments, source module 102 does not include collimating optic 306.

In the depicted example, collimating optic 306 is reflective OAP. In some embodiments, collimating optic 306 is a different optical element, such as a flat mirror, a metasurface, a diffractive element, and the like.

Scanner 110 receives the light signal 218 and redirects a portion of it through lid 310 as interrogation signal 202, scanning it in the desired precessing Lissajous pattern to interrogate scan region 206. At surface 314, Fresnel reflections give rise to optical-feedback (OF) signal 316, which comprises a second portion of light signal 218 that typically includes up to 5% of its optical energy. As interrogation signal 202 is scanned in a two-dimensional pattern over scan region 206, OF signal 316 forms an analogous scan pattern over the portion of scanner chip 304 that includes position monitor 112.

In some embodiments, as opposed to relying on only Fresnel reflections at surface 314, an optical element is included in lid 310 to give rise to OF signal 316. Examples of optical element suitable for generating OF signal 316 include, without limitation, flat mirrors, metasurfaces, diffractive elements, diffuse patterns, and the like.

Position monitor 112 includes monitor detectors 406-1 through 406-3 (referred to, collectively, as monitor detectors 406), each of which is a photodiode that includes a p-n junction formed in substrate 312 during CMOS fabrication of scanner chip 304. However, in some embodiments, at least one of monitor detectors 406 is a discrete photodetector or photodiode chip that is joined to substrate 312 using hybrid integration technology.

Monitor detectors 406 are distributed on the surface of substrate 312 such that, as scanner 110 steers interrogation signal 202 through its two-dimensional pattern, OF signal 316 sweeps over monitor detectors 406-1 through 406-3 such that each monitor detector generates one or more output pulses at one or more times that depend on the unique position of that monitor detector and the instantaneous position of mirror 402 that resulted in the optical-feedback signal being incident upon it.

Monitor detectors 406-1 through 406-3 provide output signals 408-1 through 408-3, respectively, to processor 106 as feedback signal 114.

It should be noted that the relative positions of monitor detectors 406-1 through 406-3 and mirror 402 will remain fixed throughout the lifetime of source module 102 unless package 302 is damaged or deformed in some way.

Figure 5:
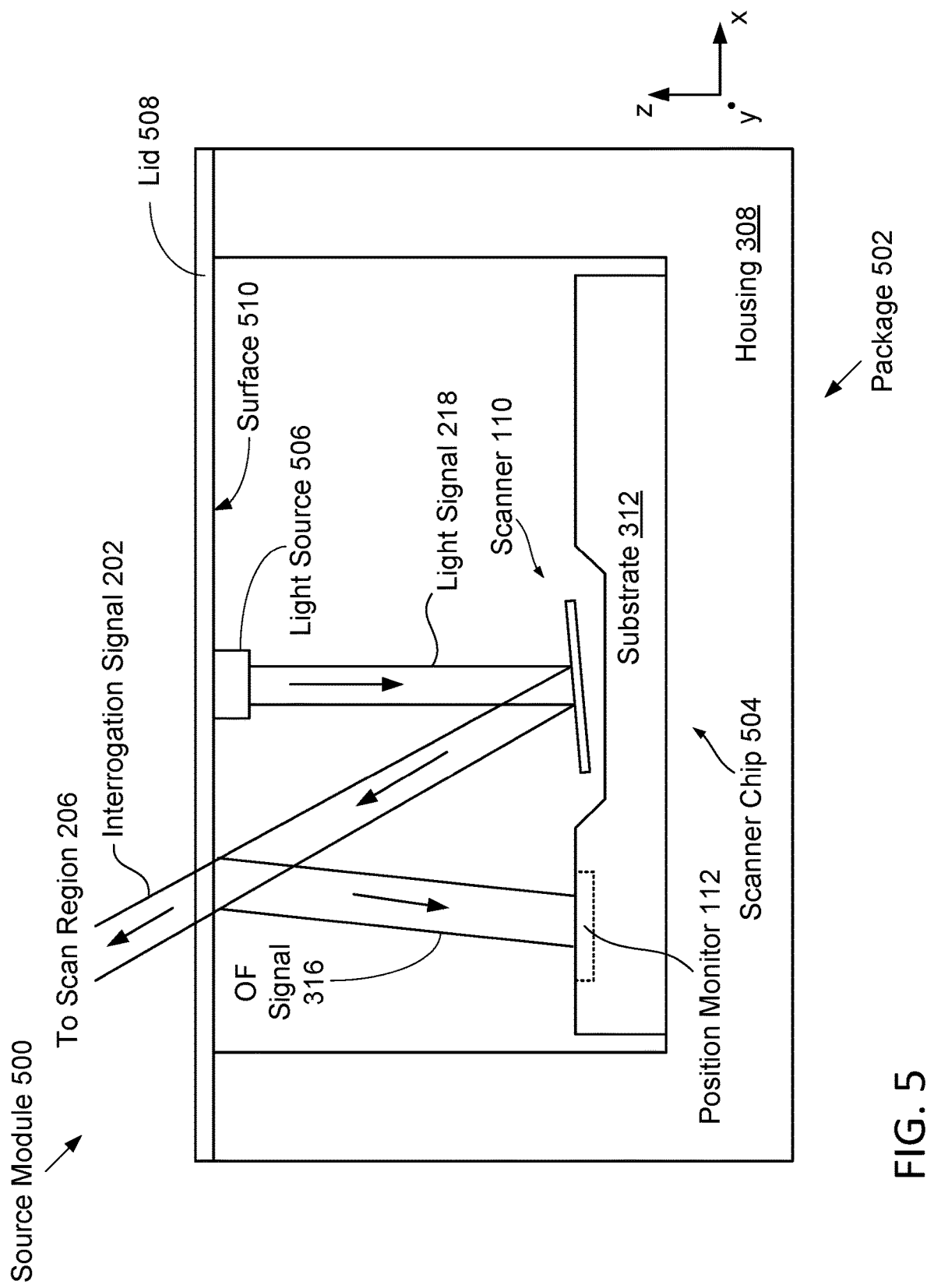
FIG. 5 depicts a schematic drawing of a cross-sectional view of a second example of a source module in accordance with the present disclosure.

FIG. 5 depicts a schematic drawing of a cross-sectional view of a second example of a source module in accordance with the present disclosure. Source module 500 comprises package 502, which encloses scanner chip 504 and light source 506.

Package 502 is analogous to package 302; however, package 502 includes lid 508, which is configured to mount light source 506 on its inner surface 510, as well as provide electrical connectivity to the light source via conductive traces (not shown).

Scanner chip 504 is analogous to scanner chip 304; however, scanner chip 504 includes only scanner 110 and position monitor 112.

Light source 506 is analogous to light source 108; however, light source 506 includes an integrated lens that substantially collimates light signal 218 as it exits the light source. In some embodiments, light signal 218 is at least partially collimated by scanner 110.

Figure 6:
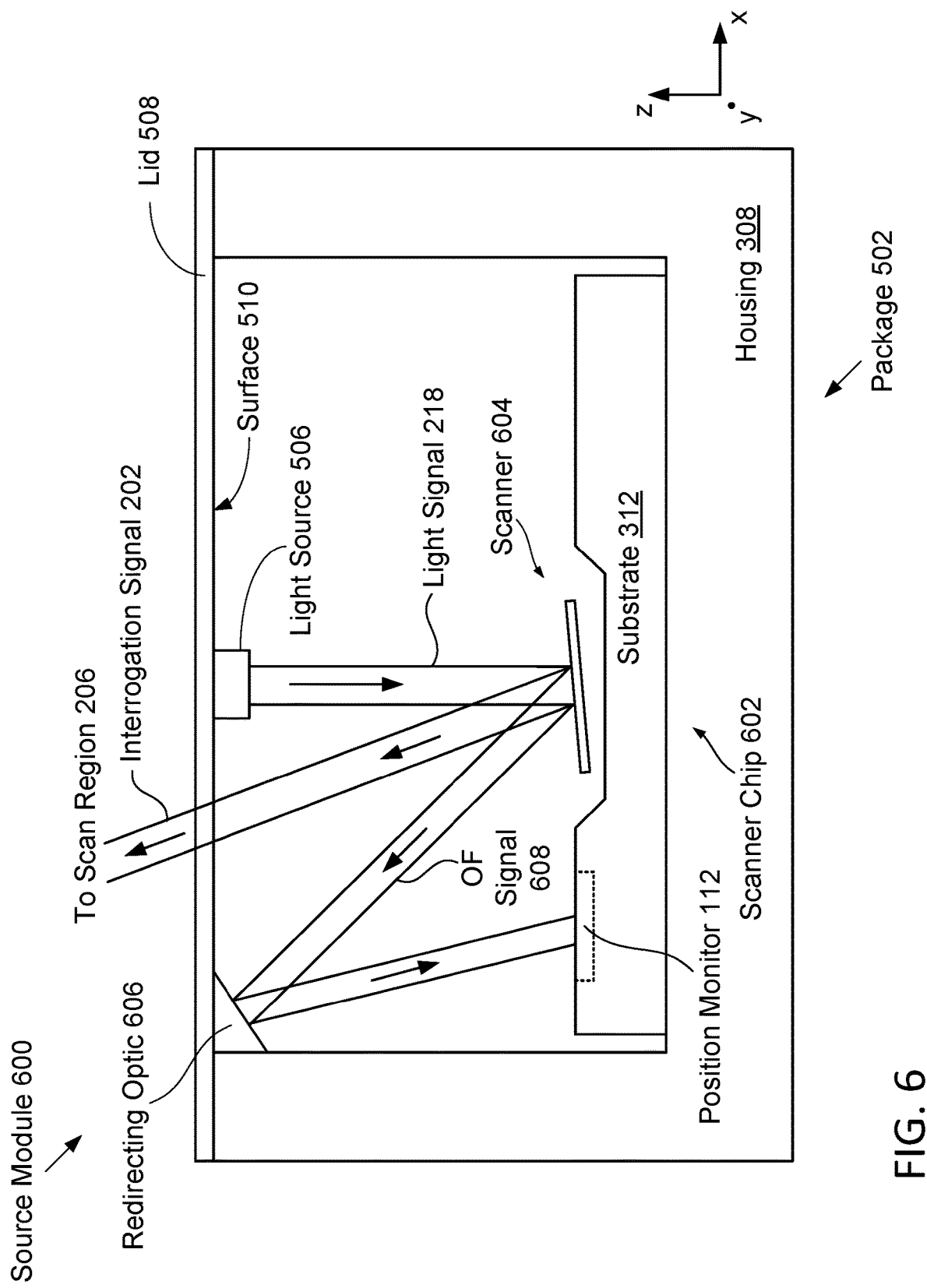
FIG. 6 depicts a schematic drawing of a cross-sectional view of a second example of a source module in accordance with the present disclosure.

FIG. 6 depicts a schematic drawing of a cross-sectional view of a second example of a source module in accordance with the present disclosure. Source module 600 comprises package 502, which encloses scanner chip 602 and light source 506.

Scanner chip 602 is analogous to scanner chip 304; however, scanner chip 602 includes scanner 604, whose scanning element comprises a diffraction grating that splits a portion of the optical energy of light signal 218 off as OF signal 608 at a known angle relative to the plane of the scanning element. In other words, the scanning element of scanner 604 is configured to distribute light signal 218 into a first portion as interrogation signal 606 and a second, smaller, portion as OF signal 608.

In some embodiments, the scanning element of scanner 604 is a different element suitable for this purpose, such as a mirrored facet, a blazed grating, a diffractive optical element, a hologram, and the like.

Interrogation signal 202 is used to interrogate scan region 206, as described above.

OF signal 608 is directed toward redirecting optic 606, which redirects the optical-feedback signal toward the portion of substrate 312 on which position monitor 112 is disposed.

In some embodiments, one or more position monitors are positioned within an overall system (such as a VR headset) but outside the scanner-module package. In some such embodiments, the components are arranged such that there is a direct path between interrogation signal and the position monitor(s), thereby enabling interrogation-signal position to be monitored relative to the overall eye-tracking system instead of only to the scanner package. In some embodiments, this is achieved by over-scanning or by redirecting part of interrogation signal 202.

Figure 7:
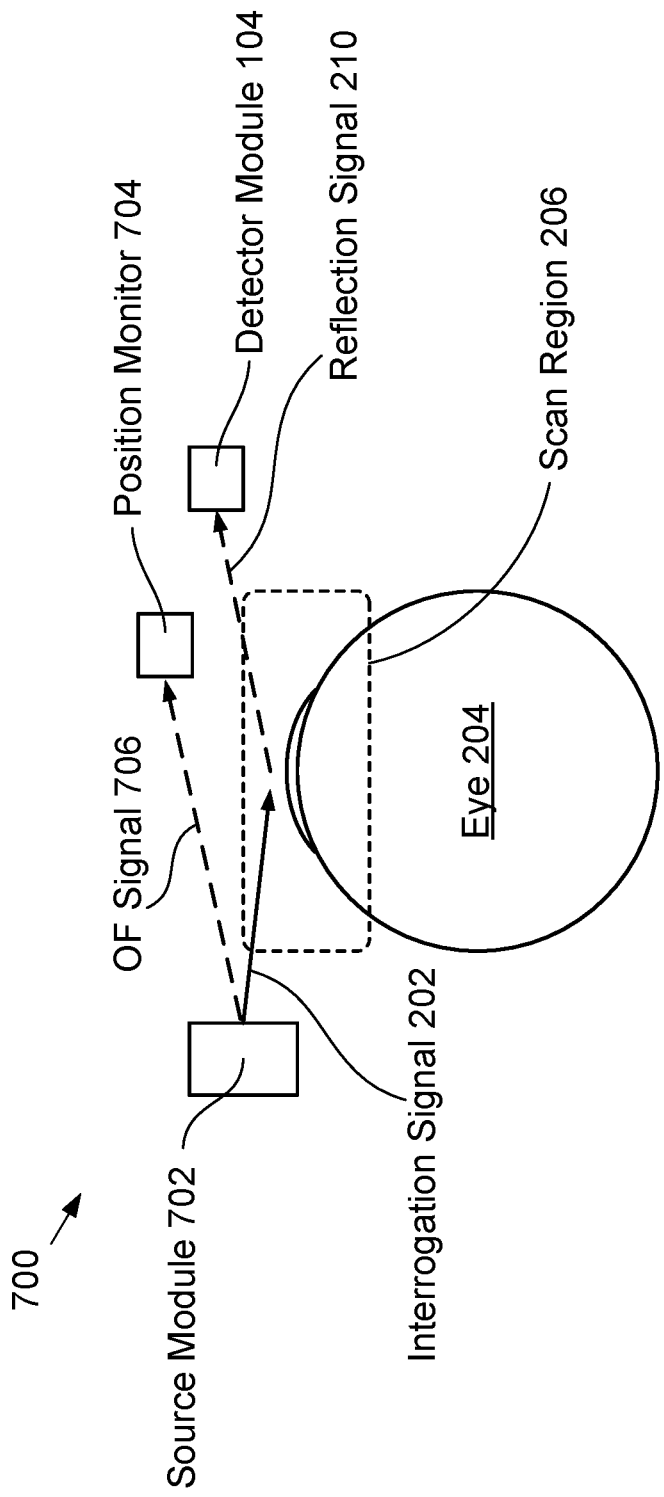
FIG. 7 depicts a schematic drawing of a first exemplary eye tracking system comprising an optical arrangement for system-level optical position sensing in accordance with the present disclosure.

FIG. 7 depicts a schematic drawing of a first exemplary eye tracking system comprising an optical arrangement for system-level optical position sensing in accordance with the present disclosure. System 700 is analogous to system 100 described above; however, system 700 includes a source module configured to generate an optical-feedback signal that is sensed by a position monitor located outside of the source-module package.

Source module 702 is analogous to source module 600; however, in source module 702, OF signal 706 is directed through lid 508 such that its propagation path diverges from that of interrogation signal 202.

Position monitor 704 is analogous to position monitor 112; however, position 704 is contained in a separate package to that of source module 702. Position monitor 704 can be mounted to frame 212 at any location suitable for enabling the position monitor to detect OF signal 706 during the scan period of interrogation signal 202.

As interrogation signal 202 is scanned about the area of scan region 206, OF signal 706 is scanned over the region of system 700 that contains position monitor 704. The position monitor then provides a commensurate output signal to processor 106, as described above and with respect to FIGS. 3 and 4.

In some embodiments, more than one position monitor is included in system 700.

Figure 8:
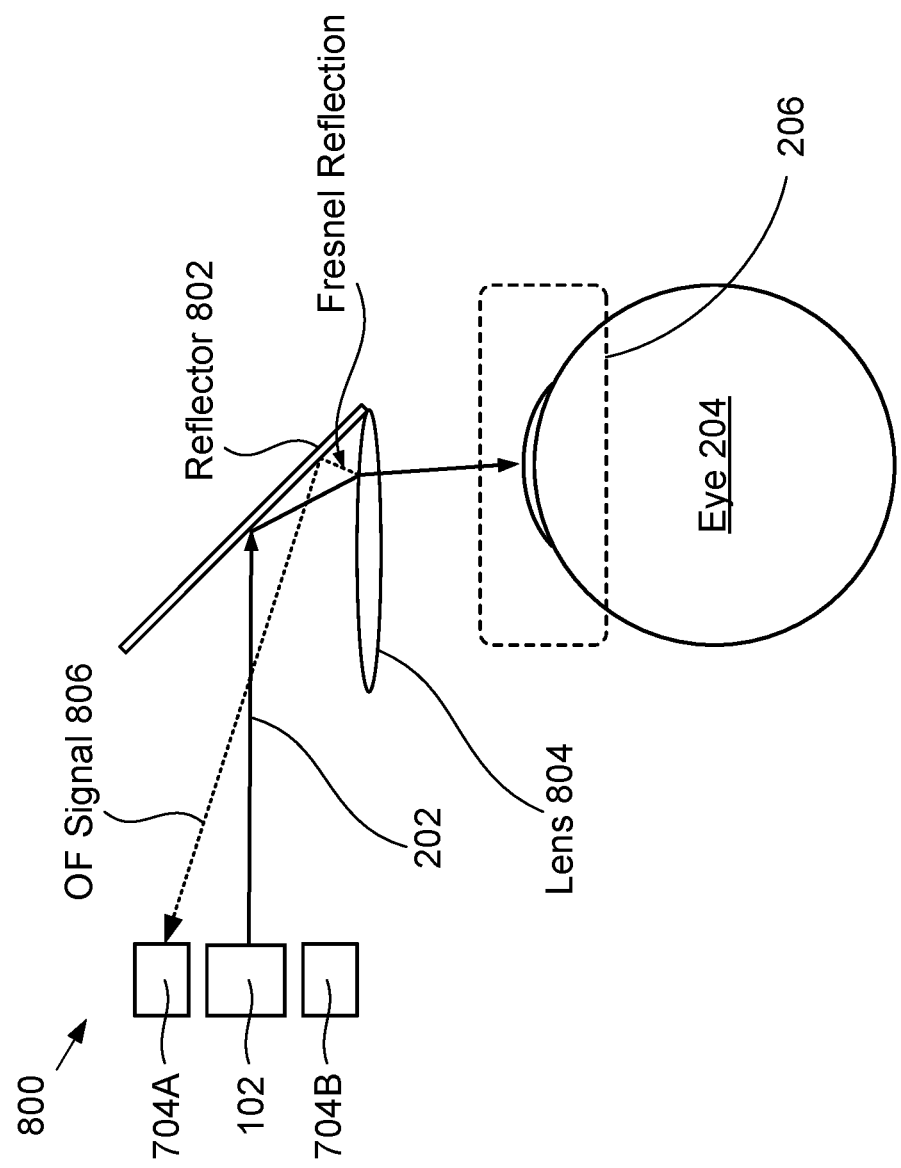
FIG. 8 depicts a schematic drawing of a second exemplary eye tracking system comprising an optical arrangement for system-level optical position sensing in accordance with the present disclosure.

FIG. 8 depicts a schematic drawing of a second exemplary eye tracking system comprising an optical arrangement for system-level optical position sensing in accordance with the present disclosure. System 800 is analogous to system 100; however, like system 700, system 800 includes a position monitor located outside of its source-module package. System 800 comprises source module 102, reflector 802, lens 804, and position monitors 704A and 704B, as well as additional components for enabling eye tracking (e.g., detector module 104, processor 106, etc.).

Reflector 802 is configured to redirect interrogation signal 202 through conventional refractive lens 804, which directs the interrogation signal to scan region 206.

At lens 804, Fresnel reflections cause some of the light of interrogation signal 202 to be redirected back toward reflector 802 as OF signal 806.

As interrogation signal 202 is scanned about the area of scan region 206, OF signal 806 is scanned over the portion of system 800 containing position monitors 704A and 704B. The position monitors then provide commensurate output signals to processor 106, as described above and with respect to FIGS. 3 and 4.

Figure 9:
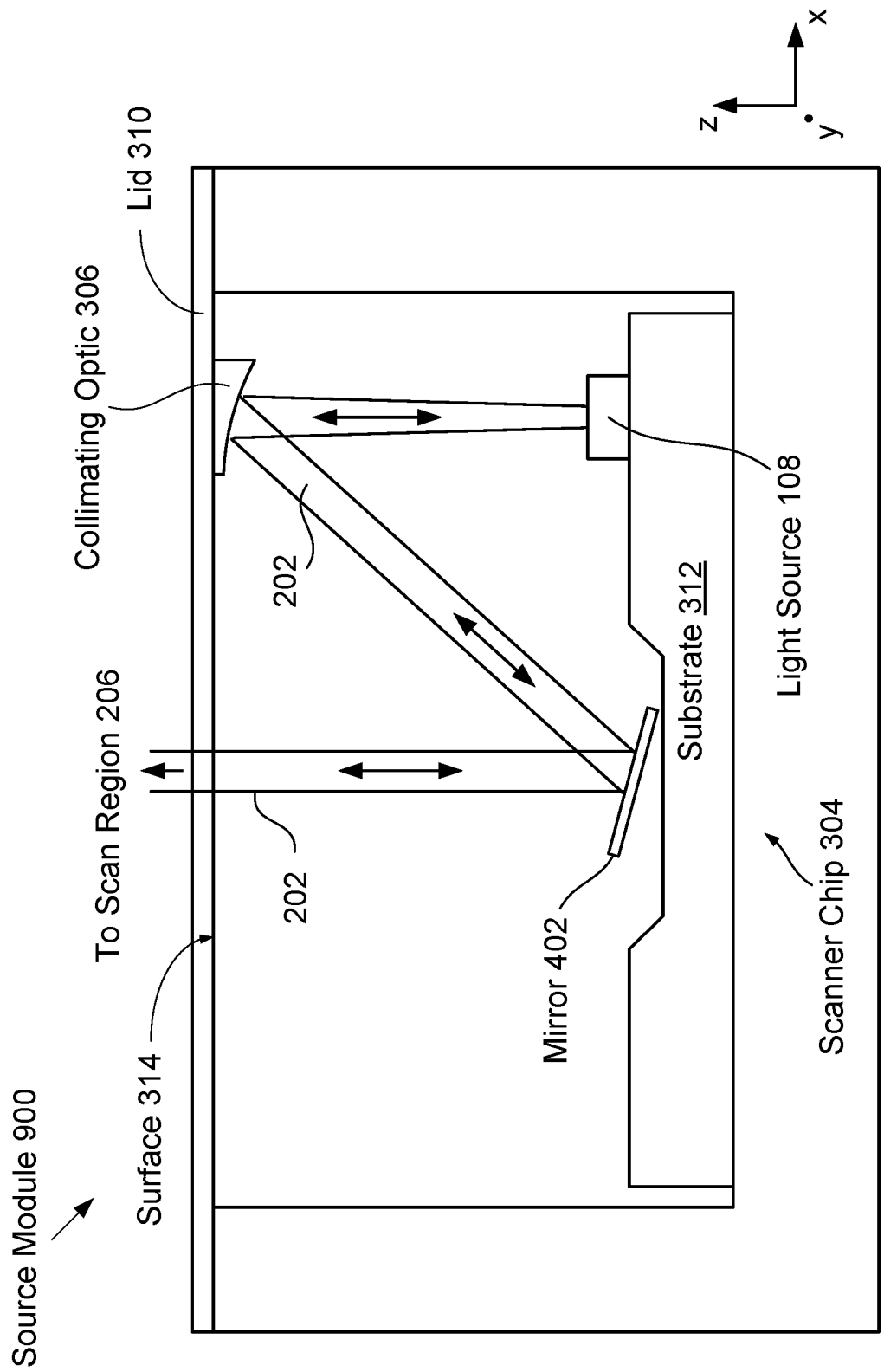
FIG. 9 depicts a schematic drawing of a source module for optically monitoring beam position using an interference pattern in accordance with the present disclosure.

FIG. 9 depicts a schematic drawing of a source module for optically monitoring beam position using an interference pattern in accordance with the present disclosure. Source module 900 is analogous to source module 102 described above; however, source module 900 is configured to exploit self-mixing of interrogation signal 202 to generate an optical-monitoring signal indicative of the instantaneous position of mirror 402.

As will be apparent to one skilled in the art, after reading this Specification, self-mixing can occur at several angles of scanning mirror 402 while the interrogation signal is scanned about the area of scan region 206.

Such self-mixing cases an internal reflection back to light source 108, which in the depicted example, is a laser diode. This reflection back to light source 108 gives rise to an interference pattern that changes its optical output characteristics.

These changes of the output characteristics of the light source can be measured electrically (or optically) at the laser driver used to drive light source 108. An interferometry event can be designed to occur at specific spatial locations, as discussed, for example, by N. Sarkar, et al., in U.S. Pat. No. 9,267,962, issued Feb. 23, 2016, which is incorporated herein by reference. This information can be used to map the system's angle outputs based on input drive conditions. In practice, with known feedback angles that produce a measurable time domain signal, a scanning pattern (e.g., a Lissajous pattern, etc.) can be calibrated into mirror space.

As briefly discussed above, embodiments disclosed herein provide an optical-feedback signal that can be used for calibration of an object tracking system or as a feedback signal in a closed-loop drive scheme. In addition, the output of a position monitor in accordance with the present disclosure can be used to determine the natural resonant frequency of each axis of a two-axis, resonant scanner, thereby enabling identification of a preferred set of drive frequencies for each axis of the scanner and/or quasi-closed-loop operation of the scanner, wherein the resonant frequencies of its axes can be periodically updated to ensure proper drive frequencies are used.

It is to be understood that the disclosure teaches just some examples of embodiments in accordance with the invention and that many variations of the invention can easily be devised by those skilled in the art after reading this disclosure and that the scope of the present invention is to be determined by the following claims.

What is claimed is:

1. A system comprising:
a source module comprising:
  a light scanner having a scanning element that is configured to receive a first light signal and steer (1) an interrogation signal in a first two-dimensional pattern over a scan region and (2) an optical-feedback signal in a second two-dimensional pattern over a first region, the interrogation signal including a first portion of the first light signal and the optical-feedback signal including a second portion of the first light signal, wherein the light scanner comprises a micromechanical system (MEMS) device that is a two-axis device having a first axis characterized by a first resonant frequency and a second axis characterized by a second resonant frequency; and
  a first package that contains the light scanner, the first package including a lid that is substantially transparent for the first light signal;
a position monitor located in the first region, the position monitor configured to provide a feedback signal based on the optical-feedback signal; and
a processor configured to estimate an instantaneous position of the scanning element based on the feedback signal.

2. The system of claim 1 wherein the first package further contains the position monitor.

3. The system of claim 2 wherein the light scanner and position monitor are monolithically integrated on a first substrate.

4. The system of claim 3 wherein the position monitor includes at least one photodiode comprising a p-n junction.

5. The system of claim 2 further comprising a light source for providing the first light signal, wherein the light source is located within the first package.

6. The system of claim 5 wherein the light scanner and the position monitor are monolithically integrated on a first substrate, and wherein the light source is disposed on the first substrate.

7. The system of claim 1 further comprising a second package that contains the position monitor, the first and second packages being different packages.

8. The system of claim 1 wherein the scanning element distributes the first light signal into the interrogation signal and the optical-feedback signal.

9. The system of claim 1 wherein the light scanner directs the first light signal to the lid, the lid being configured to distribute the first light signal into the interrogation signal and the optical-feedback signal by (1) enabling the interrogation signal to transit the lid and (2) reflecting the optical-feedback signal.

10. The system of claim 9 wherein the lid includes an optical element that reflects the optical-feedback signal.

11. The system of claim 1 wherein the system further includes a detection module for providing a first output signal based on a reflection signal from the scan region, the scan region being a region of an eye and the reflection signal being based on the interrogation signal, and wherein the processor is further configured to estimate a gaze vector for the eye based on the first output signal.

12. The system of claim 1 wherein the processor is further configured to drive the first axis with a first periodic signal having a first drive frequency and drive the second axis with a second period signal having a second drive frequency, and wherein at least one of the first periodic signal and second periodic signal is based on the feedback signal.

13. The system of claim 12 wherein the first drive frequency and second drive frequency give rise to the first two-dimensional pattern being a precessing Lissajous pattern.

14. The system of claim 1 wherein the processor is further configured to estimate a transfer function for the light scanner based at least in part on the feedback signal.

15. A method comprising:
receiving a first light signal at a light scanner that is a micromechanical system (MEMS) device having a scanning element, a first actuator, and a second actuator, the first actuator being configured to rotate the scanning element about the first axis and the second actuator configured to rotate the scanning element about a second axis, wherein the first axis has a first resonant frequency and the second axis has a second resonant frequency;
driving the light scanner to steer (1) an interrogation signal in a first two-dimensional pattern over a scan region and (2) an optical-feedback signal in a second two-dimensional pattern over a first region, the interrogation signal including a first portion of the first light signal and the optical-feedback signal including a second portion of the first light signal;
providing a feedback signal based on the optical-feedback signal, the feedback signal being provided by a position monitor located within the first region; and
estimating an instantaneous position of the scanning element based on the feedback signal.

16. The method of claim 15 further comprising providing the light scanner and position monitor such that they are both contained in a first package.

17. The method of claim 16 wherein the light scanner and position monitor are provided such that they are monolithically integrated on a first substrate.

18. The method of claim 17 further comprising forming the position monitor such that it includes at least one p-n junction.

19. The method of claim 17 further comprising forming the light scanner and the position monitor via conventional CMOS fabrication techniques.

20. The method of claim 15 further comprising:
providing the light scanner such that it is contained within a first package; and
providing the position monitor such that it is contained in a second package;
wherein the first package and second package are separate packages.

21. The method of claim 15 further comprising:
providing a first output signal based on a reflection signal from the scan region, the scan region being a region of an eye and the reflection signal being based on the interrogation signal; and
estimating a gaze vector for the eye based on the first output signal.

22. The method of claim 15 further comprising:
driving the first axis with a first periodic signal having a first drive frequency; and
driving the second axis with a second period signal having a second drive frequency;
wherein at least one of the first periodic signal and second periodic signal is based on the feedback signal.

23. The method of claim 22 further comprising selecting the first drive frequency and second drive frequency such that the first two-dimensional pattern is a precessing Lissajous pattern.

24. The method of claim 15 further comprising estimating a transfer function for the light scanner based at least in part on the feedback signal.

* * * * *